US012263671B2

(12) United States Patent
D'Annunzio et al.

(10) Patent No.: US 12,263,671 B2
(45) Date of Patent: Apr. 1, 2025

(54) LINEAR INK DISPENSING SYSTEM

(71) Applicant: BOBST FIRENZE S.R.L., Campi Bisenzio (IT)

(72) Inventors: Federico D'Annunzio, Florence (IT); Antonio Bellosi, Florence (IT)

(73) Assignee: BOBST FIRENZE S.R.L, Campi Bisenzio (IT)

( * ) Notice: Subject to any disclaimer, the term of this patent is extended or adjusted under 35 U.S.C. 154(b) by 0 days.

(21) Appl. No.: 17/415,644

(22) PCT Filed: Dec. 18, 2019

(86) PCT No.: PCT/EP2019/025461
§ 371 (c)(1),
(2) Date: Jun. 17, 2021

(87) PCT Pub. No.: WO2020/126085
PCT Pub. Date: Jun. 25, 2020

(65) Prior Publication Data

US 2022/0080720 A1 Mar. 17, 2022

(30) Foreign Application Priority Data

Dec. 20, 2018 (EP) ..................................... 18020648
Mar. 29, 2019 (WO) .................. PCT/IB2019/052604

(51) Int. Cl.
*B41F 31/02* (2006.01)
*B41F 31/08* (2006.01)

(52) U.S. Cl.
CPC ............ *B41F 31/022* (2013.01); *B41F 31/08* (2013.01)

(58) Field of Classification Search
CPC ........ B41F 31/022; B41F 31/06; B41F 31/08; B41F 3/81; B41F 33/0045; B41F 31/027; B41F 31/02
See application file for complete search history.

(56) References Cited

U.S. PATENT DOCUMENTS 4,362,104 A * 12/1982 Imai .......................... B41F 5/24
101/350.4
4,643,124 A * 2/1987 Switall .................. B41F 31/022
118/259

(Continued)

FOREIGN PATENT DOCUMENTS

CN 1157214 A 8/1997
CN 102712190 A 10/2012

(Continued)

OTHER PUBLICATIONS

International Search Report and Written Opinion issued on Mar. 24, 2020 in counterpart International Patent Application No. PCT/EP2019/025461 (12 pages, in English).

*Primary Examiner* — Jennifer Bahls
*Assistant Examiner* — Quang X Nguyen
(74) *Attorney, Agent, or Firm* — Bookoff McAndrews, PLLC

(57) ABSTRACT

This invention discloses an ink dispensing system for a printer using the nip area between the inking cylinder and the gravure/anilox cylinder as the sole source of inking. Our solution solves the problem of reducing the amount of ink present in the inking buffer, i.e. the nip area, of such printing machines, thereby accelerating the reaction time of an ink replacement and reducing the amount of waste and the cleaning time. The idea behind the invention is to provide ink to the nip area at selected locations when needed by using a dispensing apparatus that moves along the nip area.

20 Claims, 3 Drawing Sheets

(56) References Cited

U.S. PATENT DOCUMENTS

| | | | | |
|---|---|---|---|---|
| 5,697,299 | A * | 12/1997 | Umetani | B41F 31/08 101/366 |
| 6,019,040 | A * | 2/2000 | Mollers | B41F 31/022 101/367 |
| 10,159,985 | B2 * | 12/2018 | Braun | B02C 4/36 |
| 2001/0011510 | A1 | 8/2001 | Koehler | |
| 2001/0011512 | A1 * | 8/2001 | Koehler | B41F 31/022 101/365 |
| 2006/0139417 | A1 * | 6/2006 | Iwamoto | B41F 31/022 347/85 |
| 2012/0033200 | A1 * | 2/2012 | Bentmar | G01B 11/06 356/51 |
| 2014/0084092 | A1 | 3/2014 | Braun et al. | |
| 2019/0275785 | A1 * | 9/2019 | Taniike | B41F 17/26 |

FOREIGN PATENT DOCUMENTS

| | | | | |
|---|---|---|---|---|
| CN | 102806764 | A | 12/2012 | |
| DE | 19705006 | A1 | 8/1997 | |
| DE | 29522163 | U1 | 4/2000 | |
| DE | 102011004944 | A1 * | 9/2012 | B01F 15/0238 |
| EP | 0309681 | B1 | 3/1994 | |
| EP | 0950521 | A1 * | 10/1999 | |
| GB | 2357733 | A | 7/2001 | |
| JP | H09239958 | A1 | 9/1997 | |
| JP | H10309797 | A | 11/1998 | |
| JP | 2001502253 | A | 2/2001 | |
| JP | 2008273100 | A * | 11/2008 | |

* cited by examiner

LINEAR INK DISPENSING SYSTEM

CROSS-REFERENCE TO RELATED APPLICATION(S)

This application is a National Stage under 35 U.S.C. § 371 of International Application No. PCT/EP2019/025461, filed Dec. 18, 2019, which claims priority to International Application No. PCT/IB2019/052604, filed on Mar. 29, 2019, and European Patent Application No. 18020648.4, filed on Dec. 20, 2018, the contents of all of which are incorporated by reference in their entirety.

FIELD OF THE INVENTION

This invention relates to an ink distribution system for a printing press. In particular, it relates to a system and method to dispense and spatially distribute the ink in the inking system of a printing press.

TECHNICAL BACKGROUND

A printing machine is composed of several printing units; each printing unit is printing one colour on a substrate. The combination of colours results in the coloured printed pattern. Modern printing machines tend to be faster than older models, while the printing jobs tend to be shorter in size. As a consequence the job changeover time, which often involves changing the ink in a printing unit, becomes increasingly important. Also, there are modern machines that offer an inline quality control system that verifies the quality of the printed material and feeds back the result to the printing units. The reaction time between the detection of a quality issue and its resolution is important. To address these two issues, the tendency goes toward reducing the amount of ink in the buffer of the inking sub-system. This reduces the waste if the ink must be replaced between printing jobs, accelerates the cleaning when replacing ink, and accelerates the reaction time for printers that can adjust the composition of ink supplied to the inking buffer. The invention disclosed in this document is suitable for a printing machine that uses an inking buffer in a nip area between two cylinders, or more generally, that uses an elongated and narrow inking buffer. The nip area is created between a first cylinder, called the inking cylinder, whose function is to bring the ink toward the nip area and "push" it into the second cylinder, called the etched cylinder. The second cylinder may be the anilox of a flexographic printing unit, the plate cylinder of an offset printing unit or the printing cylinder of a gravure printing unit. Depending on the pattern to be printed, the consumption of ink along the nip area may be variable. For example, if the printing unit is printing in yellow, and the yellow component of the image to be printed contains a lot of ink on its left side, and no ink on the right side, the ink consumption will be large on one side of the nip area and tiny on the other side. To avoid this kind of problems, the solution from the state of the art is using an important amount of ink so that the ink has enough time to spread over the whole length of the nip to avoid lacking some ink in certain regions of the printed image.

SUMMARY OF THE INVENTION

The present solution solves the problem of further reducing the amount of ink present in the inking buffer of a printing machine, thereby accelerating the reaction time of an ink correction as well as reducing the time needed for cleaning and replacing the ink in a printing unit. The idea behind the invention is to provide ink to the nip area at selected locations when needed by using a dispensing apparatus that moves along the nip area.

The present invention discloses an inking system for a rotary printing machine. The invention is suitable for a printing unit having a nip area arranged to retain ink between an inking cylinder and an etched cylinder. Preferably, the inking and etched cylinder are configured to rotate according to the same direction, thereby sliding over each other. The inking system has a pipe and a sensor connected to a carriage. The carriage transports an outlet of the pipe and the sensor back and forth along the length of the nip area, thereby pouring ink into the nip area (the outlet is either the tip of the pipe itself or the end of an additional duct to which the pipe is connected). A supply device supplies ink to the pipe. The sensor is connected to a control system 100, which ensures that the nip area is covered by a desired level of ink in every location and adjusts the supply device accordingly.

The invention discloses a method for dispensing ink to a rotary printing unit. The method translates an ink outlet back and forth along the length of the nip area, above the inking cylinder. Ink is provided in controlled amounts to the nip area. The sensor that travels along with the ink outlet measures the (local) level of ink in the nip area, and then,

- whenever the local ink level is below a first boundary, the flow of ink is increased to increase the local ink level, and
- whenever the local ink level is above a second boundary, the flow of ink is decreased to decrease the local ink level in the nip area. As a result, the method ensures that the ink level is (approximately) kept between these two boundaries in every location along the nip area length; the second boundary being larger or equal to the first boundary.

There is no recirculation of ink taking place from the nip area back to the inking system.

Advantageously, the carriage may comprise a releasable mount for attaching the ink pipe. The pipe is arranged to pour ink on the inking cylinder (through its tip). Thus, when changing the pantone ink of a printing unit, the pipe (and the ink can be easily exchanged without having to clean it.

Another aspect of the invention uses a supply device capable of changing in real time the ink characteristics delivered to the nip area. Said supply device may for example comprise two or more ink reservoirs, a mixer and a subsystem able to draw ink on controllable amounts from the reservoirs. The result is an inking system that can change the printed ink characteristics in a very reactive manner. The reactivity is conferred by the low amount of ink involved between the supply device and the print.

By using little ink, the time needed to consume the ink is reduced and so is the time taken by the ink to reach the print medium. Thus, while in operation, the inking system does not have to alter the ink already present in the nip area, because it is quickly replaced by new ink. Therefore, there is no need for a return channel from the nip area to the inking system. These channels are sometimes used in the state-of-the art solutions for remixing the ink with new ink or with solvent to correct the composition of the ink in the ink buffer.

BRIEF DESCRIPTION OF THE FIGURES

Embodiments of the present invention are illustrated by way of example in the accompanying drawings in which reference numbers indicate the same or similar elements and in which.

DETAILED DESCRIPTION OF THE INVENTION AND OF SOME OF ITS EMBODIMENTS

Figure 1:
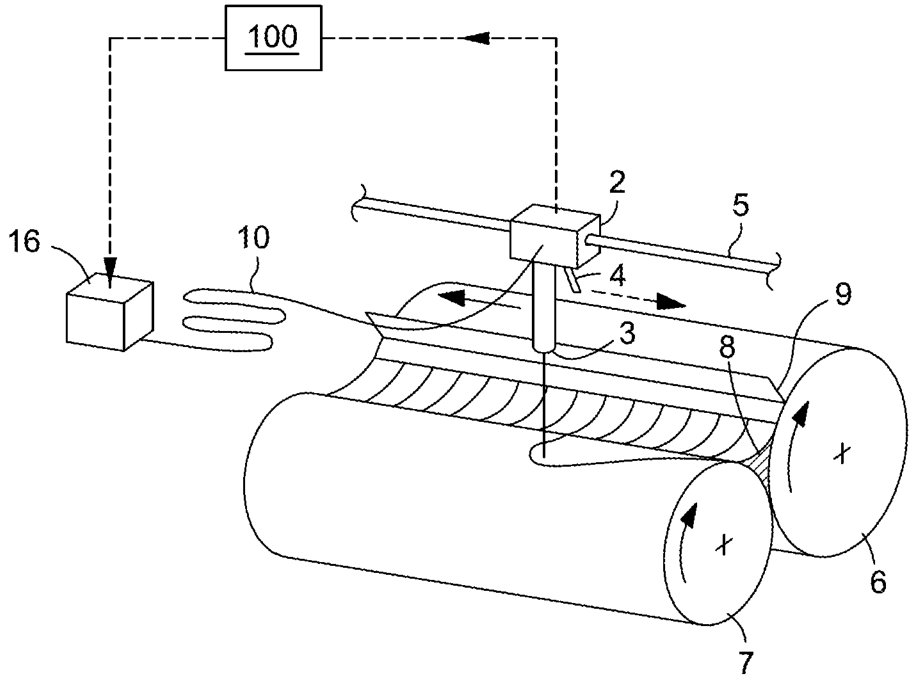
FIG. 1 shows a perspective view of an example of a dispensing system with the ink outlet and sensor assembly travelling above the nip area.

FIG. 1 shows an example of a dispensing device. A carriage 2 travels along an axis 5 located above the inking cylinder. The carriage holds the outlet 3 of an ink pipe 10 as well as a sensor 4. The sensor 4 measures the distance from the sensor to the surface of the ink located in the nip, thereby estimating the amount of ink present in the nip area 8 just below the sensor 4. The figure shows the inking cylinder and the etched cylinder that are part of the printing unit. Ink is provided by a supply device comprising a reservoir and transported by pipe 10 to the carriage. The supply device is an active device that can supply ink in controllable quantities or with a controllable flux.

Please note that the inking cylinder is configured to rotate in a direction so as to bring the ink toward the nip area. Thus, by pouring the ink on the surface of the inking cylinder, the ink arrives in the nip area. The carriage travels along the width of said cylinder to ensure the inking over the whole width of the nip area. The ink outlet is positioned above the inking cylinder to pour ink on the inking cylinder. The sensor is directed toward the nip area and is tilted to the ink outlet (i.e. tilted to the vertical direction). By placing the outlet above the inking cylinder leaves space on the side of the etched cylinder, for example for positioning the doctor blade 9 that wipes off the surface of the etched cylinder from the ink that falls back into the nip area (provided that the etched cylinder rotates in the same direction than the inking cylinder).

When the printing unit is printing, the carriage travels back and forth along the length of the nip area, while measuring the ink level in the nip 8 with the sensor 4 and pouring a desired flow of ink into the nip 8. Ink pours out of the outlet 3 of the ink pipe 10. Whenever the local ink level (measured by sensor 4 for a given carriage location) is below a first boundary value, the flow of ink in increased to increase the local ink level, while whenever the local ink level is above a second boundary value, the flow of ink is decreased to decrease the local ink level in the nip area. The ink may be provided while the carriage 2 is travelling back and forth, or may be provided only while travelling in one of the two directions.

The carriage may be actioned by a belt and a motor, or by using a linear motor, or by using a pneumatic piston, or may be actioned by having a worm screw parallel to the axis and the related thread in the carriage. It may also use a rack in addition to (or instead of) the axis and a motor and gear on the carriage.

The carriage travels at a speed of approximately 20 cm per second. It can reasonably travel between 1 cm per second to 50 cm per second. The carriage travels (at least) along the whole width of the printable area of the etched cylinder.

Figure 2:
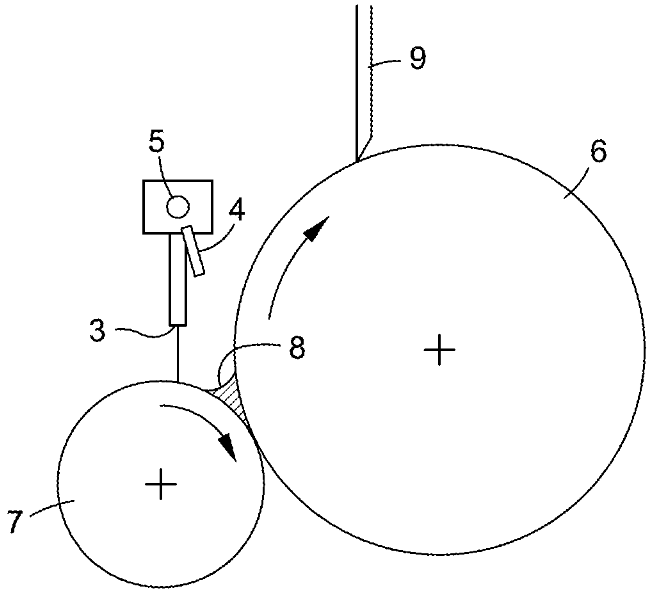
FIG. 2 shows a side view of an example of a dispensing system, showing the inking cylinder, which brings the ink flowing from the outlet to the nip area.

The sensor 4 may be a laser sensor. For example a laser time-of-flight sensor, or a laser triangulation sensor. The laser triangulation sensor has preferably its emitter and receiver aligned along travel direction of the carriage. The laser sensor is well suited for measuring the level of ink in a tilted manner, as shown in FIG. 1 or FIG. 2. As an alternative, a camera may be used instead of a sensor 4 to measure the ink level in the nip by measuring the width covered by ink in the nip 8. The camera is tilted as well and is directed toward the nip area.

There are several alternatives about the carriage and its relation to ink dispensing: In a minimalistic configuration, the carriage comprises a connector to hold the pipe 10, such that the pipe (through its tip) pours ink directly on the inking cylinder; the carriage transports the tip of the pipe 10 back and forth along the length of the nip area. The carriage may also have an ink outlet 3 on its own and a connection for the pipe that connects the pipe to said outlet 3 (through an additional duct).

The carriage may also comprise an ink mixer 30 and (at least) two connections for (at least) two ink pipes 13,23. The mixer may be active or passive, may be part of the carriage body or attached to it. The resulting mixture being directed toward the ink outlet 3. The ink outlet 3 may be the exit of the mixer 30.

FIG. 2 shows a similar example to FIG. 1, but where the inking cylinder is placed slightly differently. The line going through the axis of cylinders 6 and 7 is tilted. The inking cylinder 7 is configured to turn in a direction so that the ink poured on top of the cylinder 7 is brought toward the nip area. The configuration is very useful for retrofitting existing inking systems.

Figure 3:
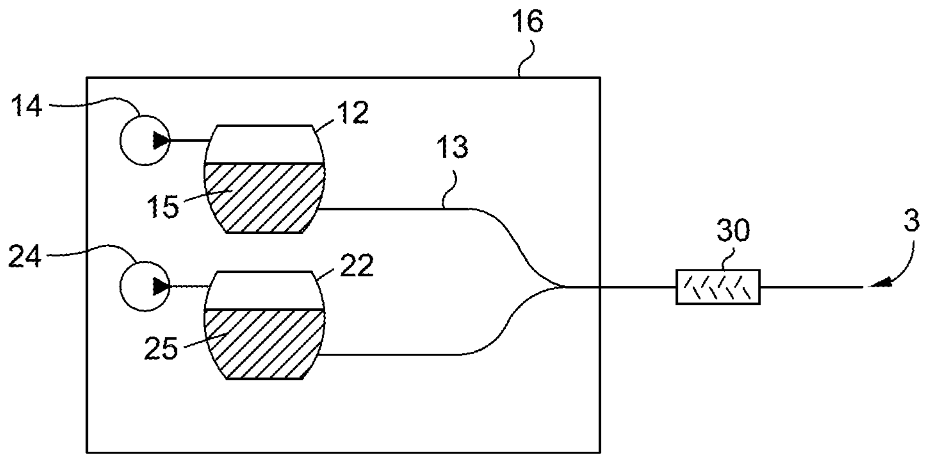
FIG. 3 shows an example of a supply device, which is able to adjust the ink characteristics.

FIG. 3 shows an example of a supply device 16 which is able to adjust the ink characteristics at the output. An air pump 14,24 is used to generate pressure in each ink chambers 12,22 that pushes the ink 15,25 out of the chamber, respectively. Each air pump is controllable electronically to adjust the pressure value for dosing the flow of ink coming out of its respective ink chambers. The proportion of ink drawn from each reservoir is regulated by adjusting the relative pressure values of the air pumps 14,24, which output the result into a mixer 30 through a Y-shaped connection. The mixer 30 mixes the ink into a homogeneous ink and outputs the result into the ink pipe 10. The ink characteristics and amount is determined by controlling the proportion of ink drawn from each reservoir. The mixer can be a passive device, or an active one where an element (for example a rotating helix, a rotating element or an oscillating body) actioned by a motor mixes the ink inside the mixer. The mixer is preferably placed on the carriage, and thus, the two ink pipes 13,23 are connected to the mixer/carriage assembly. As an alternative, the mixer can be kept close to the reservoir, and the resulting ink output in a single pipe 10. This last alternative implies having more ink in the system, thereby resulting in a less reactive system, but has the advantage of having a carriage system with less inertia.

Figure 4:
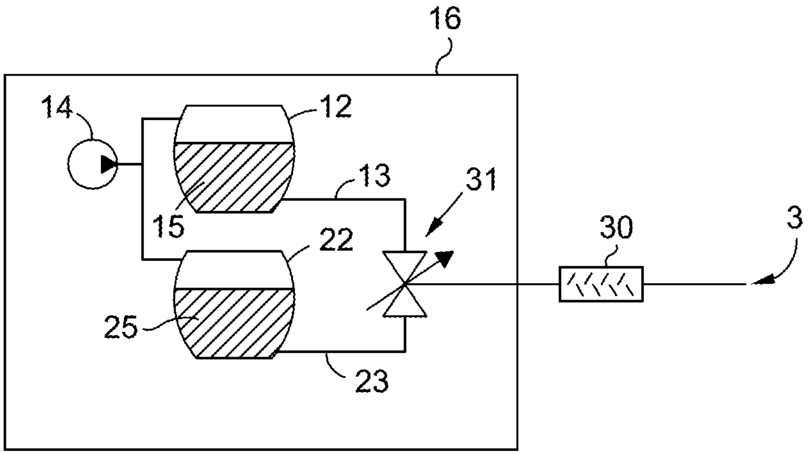
FIG. 4 shows another example of a supply device, which is able to adjust the ink characteristics.

FIG. 4 shows a different example of a supply device 16 which is able to adjust the ink characteristics at the output. An air pump 14 is used to generate pressure in the ink chambers 12,22 that pushes the ink 15,25 out of the chamber. The air pump is controllable electronically to adjust the pressure value for dosing the flow of ink coming out of the ink chambers 12,22. The proportion of ink drawn from each reservoir is regulated by an adjustable mixing valve 31, which outputs the result into a mixer 30. The mixer 30 mixes the ink into a homogeneous ink and outputs the result into the ink pipe 10. The ink characteristics and amount is determined by controlling the air pump 14 output pressure and the mixing valve 31. As in the former example, the mixer can be active or passive, on the carriage or close to the reservoir.

The length of the nip area is measured along a direction parallel to the rotation axis of the neighbouring cylinders. The width of the nip is measured perpendicularly to the length, along the surface of the ink-air interface.

Figure 5:
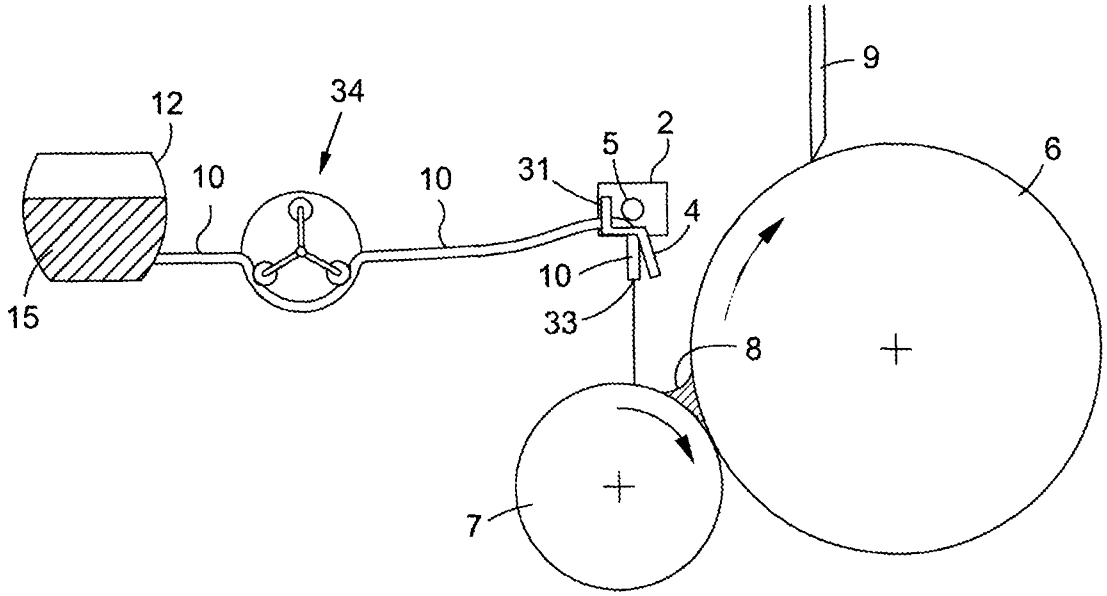
FIG. 5 shows a system to provide a printing unit.

Advantageously, when using the system to provide a printing unit with a single ink (a base ink or a "Pantone" one), the carriage 2 may comprise a releasable mount 31 for the pipe 10, as Shown in FIG. 5. The pipe 10 (through its tip 33) pours ink directly into the nip area or onto the inking cylinder. In this way, when changing the ink of the printing unit, the pipe is released from the carriage and a new one is connected to the carriage along with a new ink reservoir. This suppresses the need for cleaning the ink outlet 3, thereby accelerating the job changeover time and reducing the ink and solvent waste. A peristaltic pump 34 is well suited in this configuration (the pump may be placed on the pipe 10). Independently from the type of pump used, in this configuration there is no valve on the pipe 10.

Please note that when this document mentions an example of a dispensing system, it means an exemplary embodiment of a dispensing system according to the invention. By width of a cylinder, we mean the dimension of the cylinder measured along the rotation axis of the cylinder.

The invention claimed is:

1. A rotary printing unit comprising:

an inking cylinder and an etched cylinder, wherein the inking cylinder and the etched cylinder are arranged so that an axis between a center axis of the inking cylinder and a center axis of the etched cylinder is tilted relative to the vertical direction;

a nip area between the inking cylinder and the etched cylinder, the nip area being arranged to retain ink, wherein the inking cylinder is configured to rotate in a direction to bring ink into the nip area;

a pipe comprising an ink outlet configured to pour ink to the nip area by pouring the ink only on top of the inking cylinder, the ink outlet arranged above an ink deposit region on a surface of the inking cylinder upstream of the nip area including a cylinder contact region between the inking cylinder and the etched cylinder so that an upstream edge of the ink in the nip area is downstream of the ink deposit region, wherein a longitudinal axis of the pipe at the ink outlet is directed towards the inking cylinder so that ink poured from the pipe contacts the surface of the inking cylinder before reaching the nip area regardless of an ink pressure of the ink poured from the pipe;

a supply device configured to supply the pipe with the ink;

a sensor configured to measure a distance to the ink in the nip area and a level of the ink in the nip area downstream of the ink deposit region on the surface below the ink outlet, and arranged tilted relative to the longitudinal axis of the pipe at the ink outlet, towards the cylinder contact region between the inking cylinder and the etched cylinder in the nip area;

a carriage configured to carry the ink outlet and the sensor back and forth along a width of the inking cylinder, above the ink deposit region upstream of the cylinder contact region between the inking cylinder and the etched cylinder, and parallel to a length of the nip area such that the sensor can measure the level of the ink along the length of the nip area; and a control system functionally connected to the supply device and to the sensor, the control system being configured to maintain a desired level of ink along the length of the nip area, wherein the control system controls each of the inking cylinder and the etched cylinder to rotate in the same direction.

2. The rotary printing unit according to claim 1, wherein the carriage comprises a releasable mount for connecting and disconnecting the pipe from the carriage.

3. The rotary printing unit according to claim 1, wherein the sensor is a laser time-of-flight sensor.

4. The rotary printing unit according to claim 1, wherein the sensor extends away from the carriage in a first direction to face toward the nip area, and the ink outlet extends from the carriage in a second direction to face the inking cylinder.

5. The rotary printing unit according to claim 1, wherein the ink outlet is arranged above the inking cylinder such that ink is dispensed to the inking cylinder outside of the nip area.

6. The rotary printing unit according to claim 1, wherein the supply device comprises a plurality of ink chambers, each of the plurality of ink chambers connected to a pressure pump for delivering pressurized gas to the ink chambers, and each pressure pump is controllable electronically to adjust a pressure value of a gas output by the pressure pump for dosing a flow of ink coming out of the plurality of ink chambers.

7. The rotary printing unit of claim 1, wherein:

the nip area includes a plurality of locations that are adjacent along the length of the nip area, the plurality of locations including a first location and a second location;

the sensor is configured to measure the level of the ink separately at the first location and at the second location; and the control system is configured to maintain the desired level of ink in the first location and the second location.

8. The rotary printing unit of claim 7, wherein:

the sensor is configured to measure the level of the ink separately at each of the plurality of locations; and the control system is configured to maintain the desired level of ink in every location among the plurality of locations.

9. The rotary printing unit of claim 1, wherein the sensor is configured to be carried by the carriage to measure along an entire length of the nip area.

10. The rotary printing unit of claim 1, wherein the control system controls the level of ink in the nip area such that the level of the ink in the nip area at the inking cylinder is below the top of the inking cylinder.

11. A method for inking a rotary printing unit including an inking cylinder and an etched cylinder, comprising:

translating an ink outlet back and forth along a width of the inking cylinder, above an ink deposit region on a surface of the inking cylinder upstream of a nip area including a cylinder contact region between the inking cylinder and the etched cylinder, and parallel to a length of the nip area adjacent the inking cylinder, the ink outlet containing ink used for printing, wherein a longitudinal axis of a pipe at the ink outlet is directed towards the inking cylinder so that ink poured from the pipe contacts the ink deposit region of the inking cylinder upstream of the nip area and the cylinder contact region between the inking cylinder and the etched cylinder before reaching the nip area regardless of an ink pressure of the ink poured from the pipe;

providing ink to the nip area using a flow of ink through the ink outlet by pouring ink only on the ink deposit region on the surface of the inking cylinder upstream of the nip area and the cylinder contact region between the inking cylinder and the etched cylinder so that an upstream edge of the ink in the nip area is downstream of the ink deposit region;

rotating the inking cylinder and etched cylinder in a same direction; and measuring a local ink level in the nip area with a sensor that translates along with the ink outlet across the width of the inking cylinder, above the ink deposit region on the surface of the inking cylinder upstream of the nip area and the cylinder contact region between the inking cylinder and the etched cylinder, and parallel to the length of the nip area, and the sensor is arranged tilted with respect to the longitudinal axis of the pipe at the ink outlet, towards the cylinder contact region between the inking cylinder and the etched cylinder in the nip area;

whenever the local ink level is below a first boundary value, increasing the flow of ink to increase the local ink level; and whenever the local ink level is above a second boundary value, decreasing the flow of ink to decrease the local ink level in the nip area, wherein the second boundary value is larger or equal to the first boundary value, wherein the inking cylinder and the etched cylinder are arranged so that an axis between a center axis of the inking cylinder and a center axis of the etched cylinder is tilted with respect to the vertical direction.

12. The method according to claim 11, wherein the inking cylinder and an etched cylinder are arranged so that an axis between the inking cylinder and the etched cylinder is tilted toward the ink outlet.

13. The method according to claim 11, wherein the sensor is a laser sensor or a camera sensor, the sensor facing the nip area.

14. The method of claim 11, wherein the nip area includes a plurality of locations that are adjacent along the length of the nip area; and the method further comprises:

measuring the local ink level separately at each location among the plurality of locations, and for each location:

whenever the local ink level is below the first boundary value, increasing the flow of ink to increase the local ink level, and whenever the local ink level is above the second boundary value, decreasing the flow of ink to decrease the local ink level in the nip area.

15. The method for inking a rotary printing unit of claim 11, further comprising the step of controlling the level of ink in the nip area such that the level of ink in the nip area at the inking cylinder is below the top of the inking cylinder.

16. A method for inking a rotary printing unit, comprising:

translating an ink outlet above and upstream of a nip area and a cylinder contact region provided between two rollers including an inking cylinder and an etched cylinder, wherein a longitudinal axis of a pipe at the ink outlet is directed towards an ink deposit region on a surface of the inking cylinder upstream of the nip area including the cylinder contact region between the inking cylinder and the etched cylinder so that an upstream edge of the ink in the nip area is downstream of the ink deposit region, and so that ink poured from the pipe contacts only the ink deposit region on the surface of the inking cylinder before reaching the nip area regardless of an ink pressure of the ink poured from the pipe;

translating a sensor above the ink deposit region on the surface of the inking cylinder upstream of the nip area including a cylinder contact region between the inking cylinder and the etched cylinder, and parallel to an entire length of the nip area to measure a local ink level of the nip area, wherein the sensor is configured to measure a level of ink in the nip area along the entire length of the nip area, and is arranged tilted relative to the longitudinal axis of the pipe at the ink outlet, towards the nip area; and adjusting a flow of ink through the ink outlet based on the measured local ink level, and rotating the inking cylinder and etched cylinder in a same direction;

wherein the inking cylinder and the etched cylinder are arranged so that an axis between a center axis of the inking cylinder and a center axis of the etched cylinder is tilted with respect to the vertical direction.

17. The method of inking a rotary printing unit of claim 16, further comprising the step of controlling the level of ink in the nip area such that the level of ink in the nip area at the inking cylinder is below the top of the inking cylinder.

18. A rotary printing unit comprising:

a nip area between an inking cylinder and an etched cylinder, the nip area being arranged to retain ink;

a pipe comprising an ink outlet configured to pour ink to the nip area by pouring the ink only on an ink deposit region on a surface of the inking cylinder upstream of the nip area including a cylinder contact region between the inking cylinder and the etched cylinder so that an upstream edge of the ink in the nip area is downstream of the ink deposit region;

a supply device configured to supply the pipe with the ink;

a sensor configured to measure a level of the ink in the nip area along an entire length of the nip area downstream of the ink deposit region on the surface below the ink outlet, and arranged tilted to the vertical direction towards the nip area;

a carriage configured to carry the ink outlet and the sensor back and forth along a width of the inking cylinder, above the ink deposit region, and parallel to the length of the nip area; and a control system functionally connected to the supply device and to the sensor, the control system being configured to maintain a desired level of ink along the length of the nip area, wherein the inking cylinder and the etched cylinder are arranged so that an axis between a center of the inking cylinder and a center of the etched cylinder is tilted with respect to the vertical direction, the inking cylinder is configured to rotate in a direction that brings ink toward the nip area, wherein the control system controls each of the inking cylinder and the etched cylinder to rotate in the same direction.

19. The rotary printing unit of claim 18, further comprising a plurality of ink chambers configured to provide ink to the inking cylinder and an adjustable mixing valve, wherein the adjustable mixing valve is configured to mix a flow of ink coming out of the plurality of ink chambers.

20. The rotary printing unit of claim 18, wherein the control system controls the level of ink in the nip area such that the level of the ink in the nip area at the inking cylinder is below the top of the inking cylinder.

* * * * *